(12) United States Patent
Chabrut

(10) Patent No.: US 8,002,091 B2
(45) Date of Patent: Aug. 23, 2011

(54) CLUTCH BETWEEN A ROTARY OUTPUT DRIVE SHAFT FOR A CUTTING DEVICE, A ROTARY CUTTER AND CUTTING DEVICE PROVIDED WITH SAID CLUTCH

(76) Inventor: Michel Chabrut, Fenery (FR)

( * ) Notice: Subject to any disclaimer, the term of this patent is extended or adjusted under 35 U.S.C. 154(b) by 399 days.

(21) Appl. No.: 11/596,200

(22) PCT Filed: May 11, 2005

(86) PCT No.: PCT/FR2005/001176
§ 371 (c)(1),
(2), (4) Date: Jan. 5, 2007

(87) PCT Pub. No.: WO2005/116475
PCT Pub. Date: Dec. 8, 2005

(65) Prior Publication Data
US 2007/0170021 A1    Jul. 26, 2007

(30) Foreign Application Priority Data
May 14, 2004 (FR) .................................... 04 05269

(51) Int. Cl.
*B60T 8/72* (2006.01)
*F16D 65/00* (2006.01)

(52) U.S. Cl. ............. 188/181 A; 188/185; 192/105 CD; 192/105 CE

(58) Field of Classification Search ............. 188/181 R, 188/181 A, 181 T, 184, 185, 186; 192/103 C, 192/104 C, 105 CD, 105 CE
See application file for complete search history.

(56) References Cited

U.S. PATENT DOCUMENTS

| | | | | |
|---|---|---|---|---|
| 1,162,309 A | * | 11/1915 | Renault | 290/46 |
| 1,834,624 A | * | 12/1931 | Kappler | 188/184 |
| 2,051,400 A | * | 8/1936 | Taylor | 192/223.2 |
| 2,400,585 A | * | 5/1946 | Wolff | 192/56.55 |
| 2,494,443 A | * | 1/1950 | Luehrs | 475/260 |
| 2,534,133 A | * | 12/1950 | Kirkpatrick | 192/105 BA |
| 2,896,912 A | * | 7/1959 | Faugier et al. | 242/381.6 |
| 2,970,680 A | * | 2/1961 | Cain | 192/105 CD |
| 3,251,445 A | * | 5/1966 | Zuck et al. | 192/105 CE |
| 3,810,533 A | | 5/1974 | Densow | |
| 5,988,328 A | * | 11/1999 | Newport | 188/186 |

FOREIGN PATENT DOCUMENTS

| | | |
|---|---|---|
| DE | 660 942 | 6/1938 |
| FR | 1 222 861 | 6/1960 |
| FR | 2 829 902 | 3/2003 |
| WO | WO-03026386 A1 * | 4/2003 |

* cited by examiner

*Primary Examiner* — Melody M Burch
(74) *Attorney, Agent, or Firm* — Young & Thompson

(57) ABSTRACT

A clutch between the rotary output drive shaft of a cutting device and a rotary cutter includes a rotor which is connected to the drive shaft and whose at least one part of the internal walls forms a friction track and a stator which bears the cutter and is driven by the rotor by pivotable friction shoes. The shoes are spring-loaded and supported by the stator, each pivotable shoe being also mounted with clearance on the plate in such a way that it is angularly displaceable between two end positions, i.e. of the clutch engaging and disengaging positions. The clutch is characterized in that the transition from the engaging position to the disengaging position is carried out during the stator deceleration by relative displacement of the shoe and the stator for compressing a second spring which brings back the shoe from the angular disengaging position to the angular engaging position.

5 Claims, 4 Drawing Sheets

CLUTCH BETWEEN A ROTARY OUTPUT DRIVE SHAFT FOR A CUTTING DEVICE, A ROTARY CUTTER AND CUTTING DEVICE PROVIDED WITH SAID CLUTCH

BACKGROUND OF THE INVENTION

1. Field of the Invention

This invention relates to a coupler between the rotary engine output shaft of a cutter, such as a brush cutter, and a rotary cutting member such as a blade, as well as a cutter equipped with such a coupler.

2. Description of the Related Art

Cutters, such as portable rotary cutters, especially brush cutters, are especially dangerous when they are equipped with a rigid cutting member, such as a blade, disk, or the like. Actually, when the torque transmitted by the engine element of said brush cutter to the cutting member becomes less than the resistant torque applied to the cutting member, in particular when it encounters an obstacle such as a rock, a violent reaction of the entire brush cutter is immediately produced. If the operator is not paying attention, this reaction can injure him. This reaction can be manifested by uncontrolled and sudden movements of the brush cutter, by breaking of the cutting member, or by breaking of all or some of the components of the engine that are unable to react to sudden stoppage of rotation of the cutting element.

To solve this problem, incorporating a torque limiter between the engine shaft and the cutting member has been suggested. For a long time, these torque limiters had been designed based on spring-loaded balls, these balls coming into compressive contact against a suitable race. In such devices, the observed drawbacks include rapid wear of the balls, damage to the race and, overall, poor service life of the torque limiter. Moreover, it turns out that torque control is difficult. Finally, poor heat dissipation is noted.

Other torque limiters using the action of two springs are known. This is the case of patents FR 1222861 and U.S. Pat. No. 3,810,533 that both describe a torque limiting device adapted to a machine comprising a rotor, driven into rotation by an engine, and a cutting device, driven by a stator, this limiting device making it possible to limit the torque transmitted to the stator at high rpm of the rotor. In these documents, the stator is driven by friction pads mounted integrally with the rotor; this entails said pads being constantly subjected to the centrifugal force induced by rotation of the rotor. Thus, when the stator stops suddenly, when the cutting device encounters an obstacle, for example, the pads continue to be applied to the stator with a very high contact pressure at the risk of continuing the driving of the stator. In this device, the centrifugal force is not cancelled when the stator stops, and major heating or damage to the machine in which such a device is installed may result.

More recently, in particular in French Patent Application FR-A-2 829 902, a coupler was proposed with a design that makes it possible to improve the dissipation of heat and to eliminate shock in the operation of the coupler, in particular by obtaining the torque to be transmitted by the radial force between the stator and rotor. In this coupler, the stator bears the pads made in the form of spring-loaded pivoting pins to be applied to the friction lining that is arranged at the rotor level. Causing the stator to turn via its pads kept in permanent contact against the friction lining of the rotor generates a centrifugal force applied to the pads. This centrifugal force is added to the spring force to obtain driving at the same speed between the stator and rotor and is cancelled under the action of accidental blocking of the stator to momentarily neutralize the driving between the rotor and stator by the shoes' sliding on the surface of the friction lining of the rotor. This coupler has a large number of advantages relative to existing systems. In fact, it allows limitation of wear of parts and minimization of heating. This coupler, during the phase of starting the turning of the engine, makes it possible in particular to obtain significant reactivity of the stator and in particular high speed driving to increased rpm of the stator due to the presence of a compression spring that permanently applies a radial force to the pad and tends to keep it in constant contact with the friction lining of the rotor.

So that this starting phase and subsequent operating phases proceed optimally, it is necessary for the friction surface between the pads and the friction lining of the rotor to be of a relatively significant size to avoid any slipping. In the version described in the aforementioned French patent, this surface remains unchanged regardless of the operating phases of the stator. Thus, whether the stator is immobilized due to the presence of an obstacle or not, the friction surface between the pads and rotor remains identical. For this reason, significant heating and faster wear of the pad during the slipping phases corresponding to the phases of deceleration or blockage of the stator can again be observed.

Moreover, all of the above-described devices generate major vibrations because in each of the preceding cases, the shaft bearing the pads and allowing their movement to enable driving of the stator is fixed. The transmission of vibrations through this shaft is therefore damped very little. As a result, the user of a machine equipped with such a device is exposed to major vibrations that can entail muscle-skeletal problems in the arm-hand system or at the level of the spinal column.

Therefore, approaches are being sought at present that would allow the coupler, at the level of the starting phase, to have the same advantages as those mentioned above, while reducing the problems of heating during slipping phases and vibration problems during operation.

SUMMARY OF THE INVENTION

One objective of this invention is thus to suggest a coupler with a design that makes it possible to optionally vary the friction surface between the friction pad and the friction lining of the rotor so as to minimize heating in the decelerated or immobilized state of the stator, without adversely affecting the re-engagement time required for passage from the disengaged position into the engaged position of said pad.

Another objective of this invention is to suggest a coupler designed to enable optional variation of the re-engagement time of said coupler corresponding to the passage from the disengaged position into the engaged position of the latter.

Another objective of this invention is to suggest a coupler whose design makes it possible to have an engagement-disengagement time of roughly 2 seconds, this time corresponding to the stages of clearance of the cutting blade from the obstacle and of restoration of contact of a cutting blade that was driven into rotation with the object to be cut.

Another objective of the invention is to suggest a coupler whose design makes it possible essentially to limit vibrations to which the user of a machine equipped with this device is exposed.

For this purpose, the object of the invention is a coupler between the rotary engine output shaft of a cutter such as a brush cutter, and a rotary cutting member such as a blade, this coupler being composed, on the one hand, of a rotor that can be made integral with the engine shaft, appearing at least in the form of a cylindrical body, such as a bell, of which at least some of the internal walls form a friction lining and, on the other hand, of a stator that can carry the cutting member, this stator being able to be driven by the rotor via friction pads carried by said stator, each pad mounted on the pad-holder plate of the stator free to pivot around an axis that is parallel to the axis of rotation of the stator, being exposed continuously to the action of at least one generally radially-acting compression spring to be applied to the friction lining of the rotor and to cause the stator to rotate, this pivoting pad being, moreover, mounted with play on said plate to be able to move angularly, especially by sliding, between two end positions, one engagement position in which the friction surface between the pad and the cylindrical body is maximum, the other of disengagement in which the friction surface between the pad and the cylindrical body is minimum, and facilitates sliding of the pad on the surface of the friction lining of the rotor, characterized in that passage from the engaged position into the disengaged position is carried out, when the stator is slowing down, by relative displacement of the pad and the stator as a second spring is compressed, this second spring tending to return the pad from the angular disengaged position to the angular engaged position in order to allow re-engagement, enabling optimum operation of said coupler, within a short time.

Due to the presence of two springs, one acting radially, the other following a direction close to the direction tangential to the stator, it is possible to perfectly manage the disengagement and re-engagement time of the coupler and to be able to perform these operations in less than 3 seconds to allow these operations to be carried out while other operations are underway. Actually, by acting on the stiffness of the second compression spring, with action that follows an essentially tangential direction, it is possible to vary the re-engagement time corresponding to the time necessary for passage of the pad from a disengaged position, corresponding to a position in which the contact surface between the pad and the friction lining of the rotor is minimum, to an engaged position that corresponds to a maximum contact surface between these same two elements. Likewise, the closer the first and second springs to one another, the shorter the re-engagement time due to the shape of the pad. Thus, it is possible to influence the characteristics and the relative position of the first and second springs to optionally vary the re-engagement time and consequently the disengagement time.

The object of the invention is likewise a cutter, especially portable, with rotary cutting, such as a brush cutter, this cutter having, between the rotary engine output shaft and a cutting member, a coupler, characterized in that the coupler is of the aforementioned type.

BRIEF DESCRIPTION OF THE DRAWING FIGURES

The invention will become clear from reading the following description of embodiments, with reference to the attached drawings, in which.

DETAILED DESCRIPTION OF THE INVENTION

As mentioned above, the coupler 1 that is the object of the invention is more especially designed to couple the rotary engine output shaft of a cutter, especially a portable cutter with rotary cutting, such as a brush cutter, and a rotating cutting member 2 such as a blade, a disk or a rotating plate of any shape.

Current brush cutters known to date thus include, in a manner known in the art, a tubular body or rod, provided with a rotary engine shaft for driving a cutting member. This rod can have a large number of shapes. It is generally provided, in the vicinity of one of its ends, with a handlebar or handle to make it easier for the operator to hold. The engine shaft is generally coupled to a heat engine or electric motor and on its output end includes a bevel gear composed of two spiral helicoidal gears. The second gear is lengthened by a shaft that can be connected on its end directly to the coupler. This coupler can thus be accommodated in the head of the brush cutter, this head essentially taking the form of a bell that is integral with the end of the tube opposite the one provided with the holding member. A detail of this engine shaft will not be provided because it is well known to those skilled in this art. This coupler can be equally well accommodated between the engine clutch and the transmission shaft.

Figure 1:
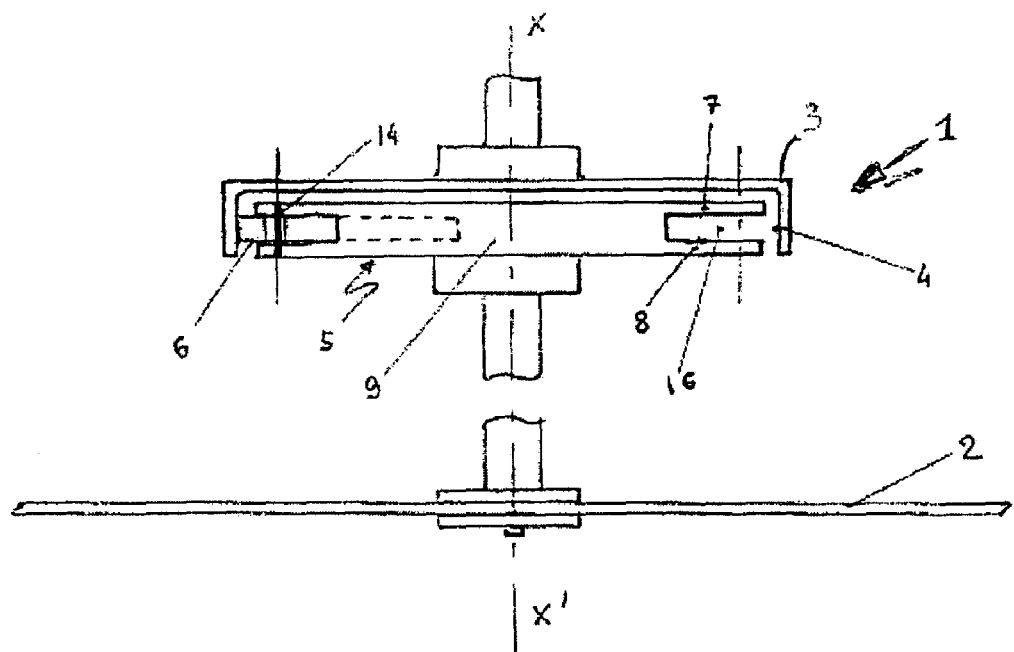
FIG. 1 shows a partial diagrammatic cutaway view of a coupler according to the invention.
Figure 2:
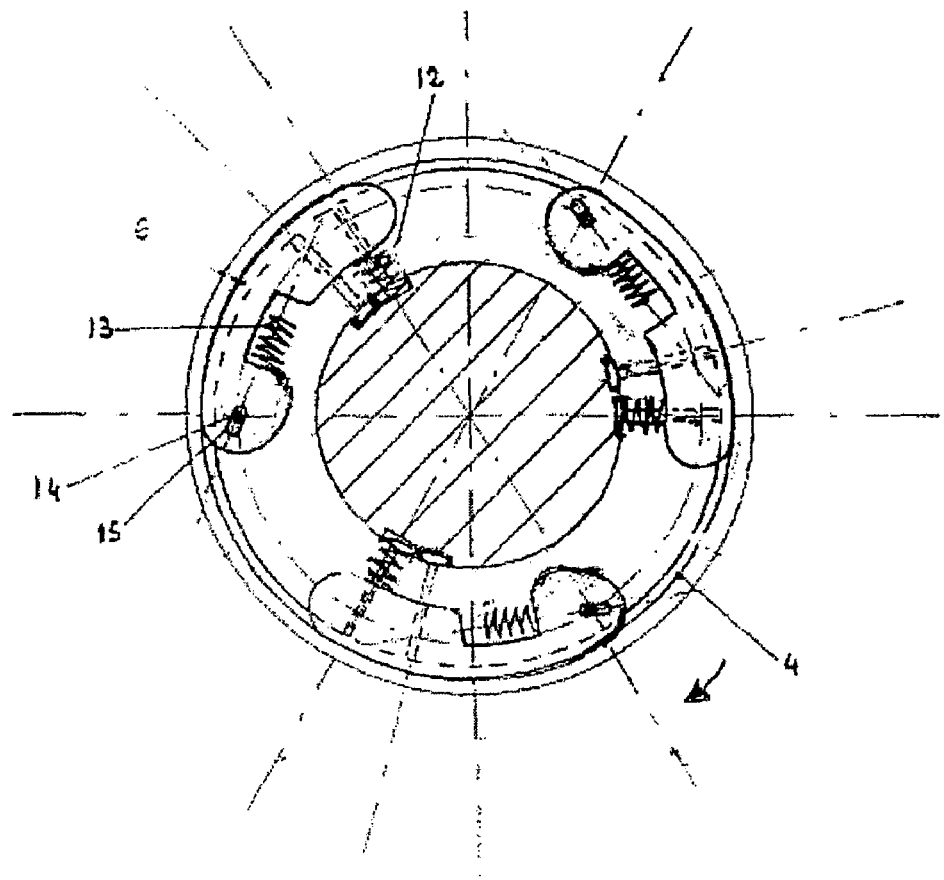
FIG. 2 shows a top view of the stator equipping such a coupler.

The coupler 1 that is intended to be located between the rotary engine output shaft of the cutter and the rigid rotating cutting member 2 is composed of, on the one hand, a rotor 3 that can be made integral with the engine shaft, and, on the other hand, a stator 5 that can carry the cutting member 2. The rotor 3 has at least the shape of a cylindrical body, such as a bell, which can have any shape. At least some of the internal walls form a friction lining 4. This friction lining 4 is a circular lining with which the pads equipping the stator are kept in permanent contact. Actually, the stator 5 that can bear the cutting member 2 can be driven by the rotor 3 via the friction pads 6 that are carried by said stator 5. It should be remarked that rotor is defined as a rotating engine drive element and stator is defined as a rotating driven element, the rotor and stator being driven into rotation around the same axis represented by the axis XX' in FIG. 1.

The friction pads 6 are mounted on the pad-holder plate of the stator 5, free to pivot around an axis parallel to the axis of rotation of stator 5. They are equally continuously exposed to the action of at least one first compression spring 12 to be applied to the friction lining 4 of the rotor 3 and to drive the stator 5 into rotation. Thus, causing the stator to rotate generates a centrifugal force applied to the pads 6. This centrifugal force is added to the force of the springs 12 to obtain driving at the same speed between the stator and rotor and is cancelled under the action of accidental blocking of the stator to momentarily neutralize the driving between the rotor and stator by the pads' sliding on the surface of the friction lining 4 of the rotor. Each pivoting pad 6 is, moreover, mounted with play on said plate. This pad 6, in the decelerated or immobilized state of the stator, is moved by relative displacement with respect to the stator and can be angularly displaced, in particular by sliding, by the rotor in a direction that causes a reduction of the friction surface between the pad and the cylindrical body. Thus, each pad passes from an engaged position, in which the friction surface between the pads 6 and the friction lining of the cylindrical body is significant, to a disengaged position, in which the friction surface between the pads 6 and the cylindrical body is reduced and facilitates sliding of the pad 6 on the surface of the friction lining 4. This disengaged position thus allows continuation of the rotation of the rotor, whereas the stator is decelerated or immobilized due to the cutting member 2 encountering an obstacle. The passage from the engaged position to the disengaged position of the pad takes place while the stator is slowing down by relative displacement of the pad and of the stator as the second spring 13 is compressed. This second spring 13 tends to return the pad 6 from the disengaged angular position to the engaged angular position. Thus, the pad is permanently subjected to the action of the two springs, a first spring that tends to move the pad against the friction lining 4 of the rotor generally by application of a radial force, and a second spring 13 that tends to return the pad from the angular disengaged position to the angular engaged position. The first spring makes it possible, at the instant of starting, to facilitate immediate adhesion of the pad to the friction lining 4. The second spring makes it possible to adapt the re-engagement time corresponding to the time necessary for passage from the disengaged position to the engaged position.

Figure 3:
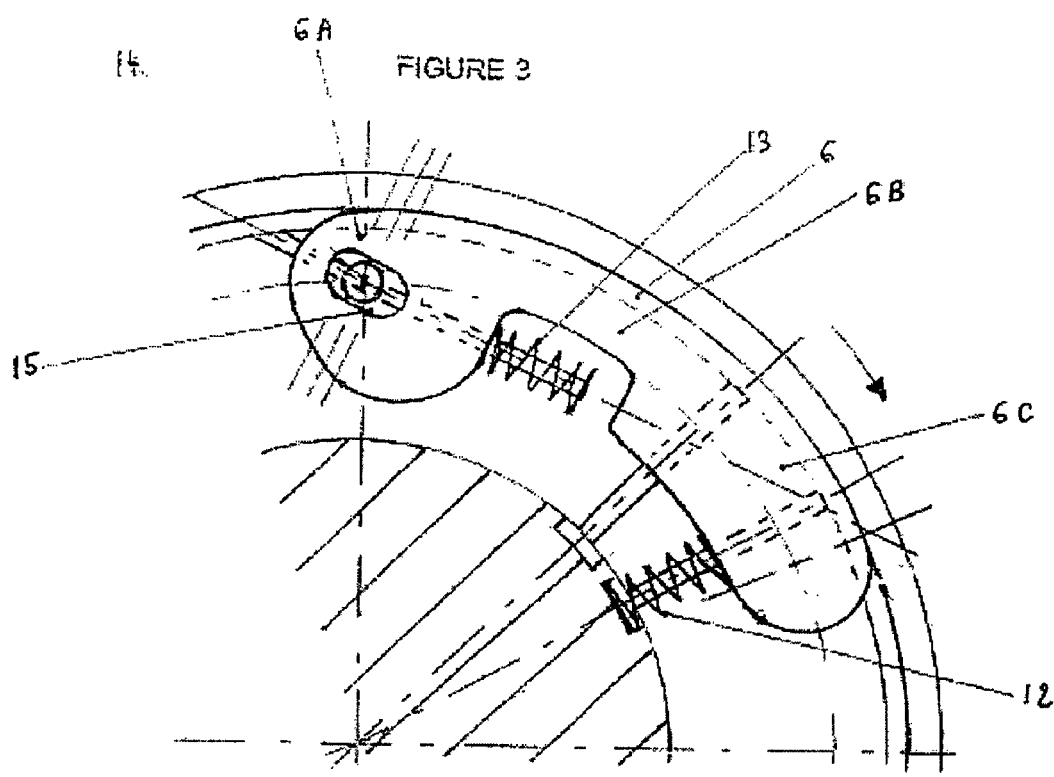
FIGS. 3 and 4 show a detailed view of the pad in the engaged position (FIG. 3) and in the disengaged position (FIG. 4)
Figure 4:
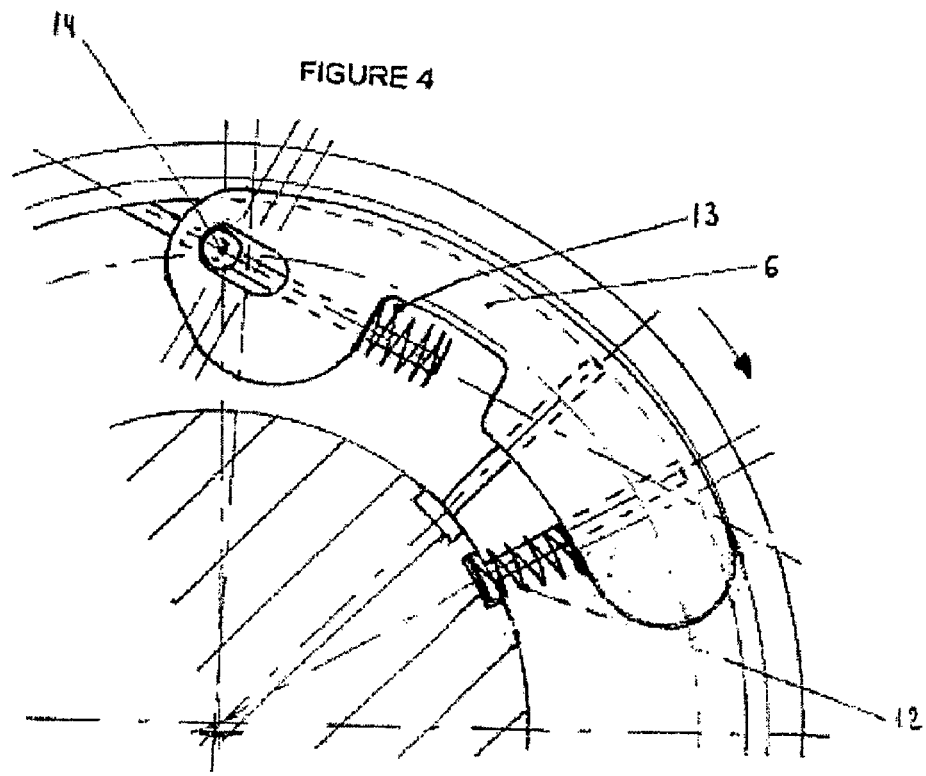
Figure 5:
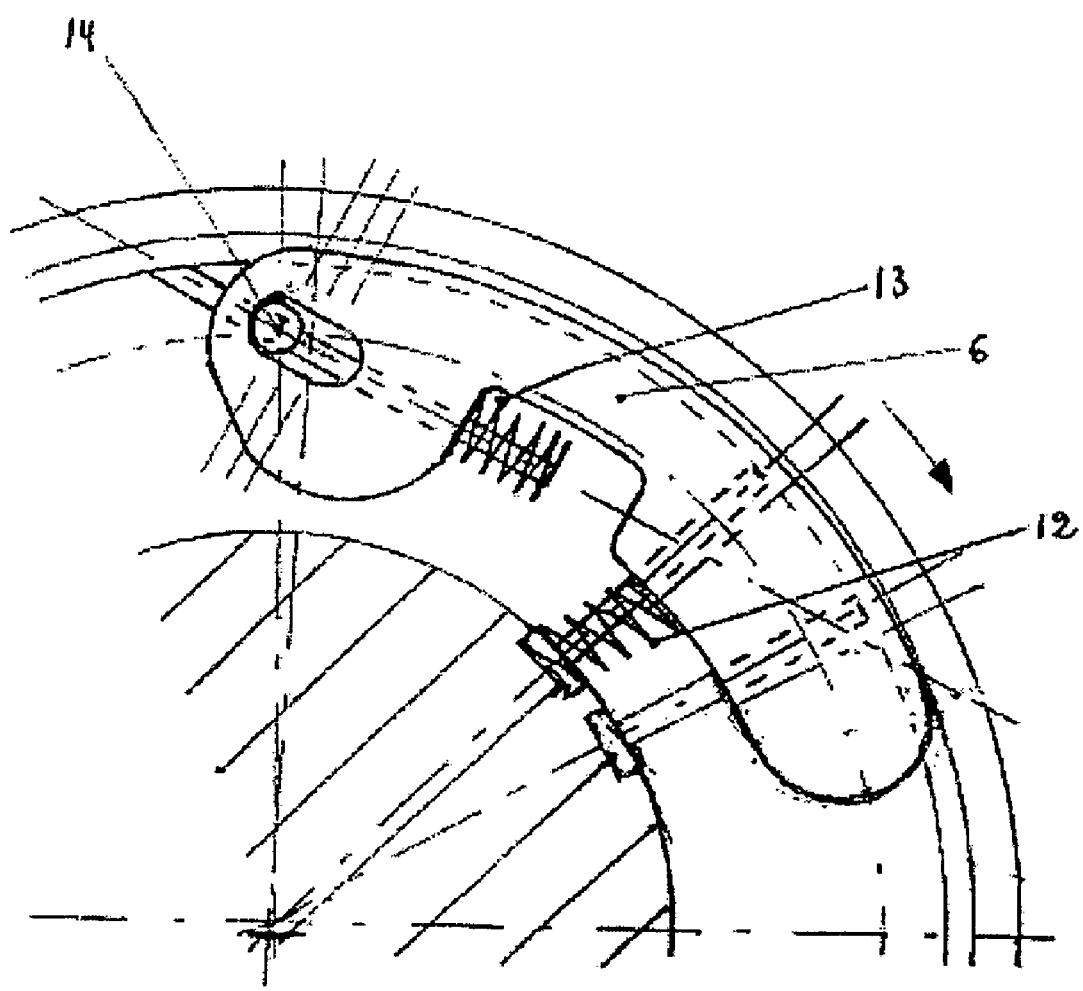
FIG. 5 shows a detailed view of the pad in another position relative to the springs to increase the re-engagement time.
Figure 6:
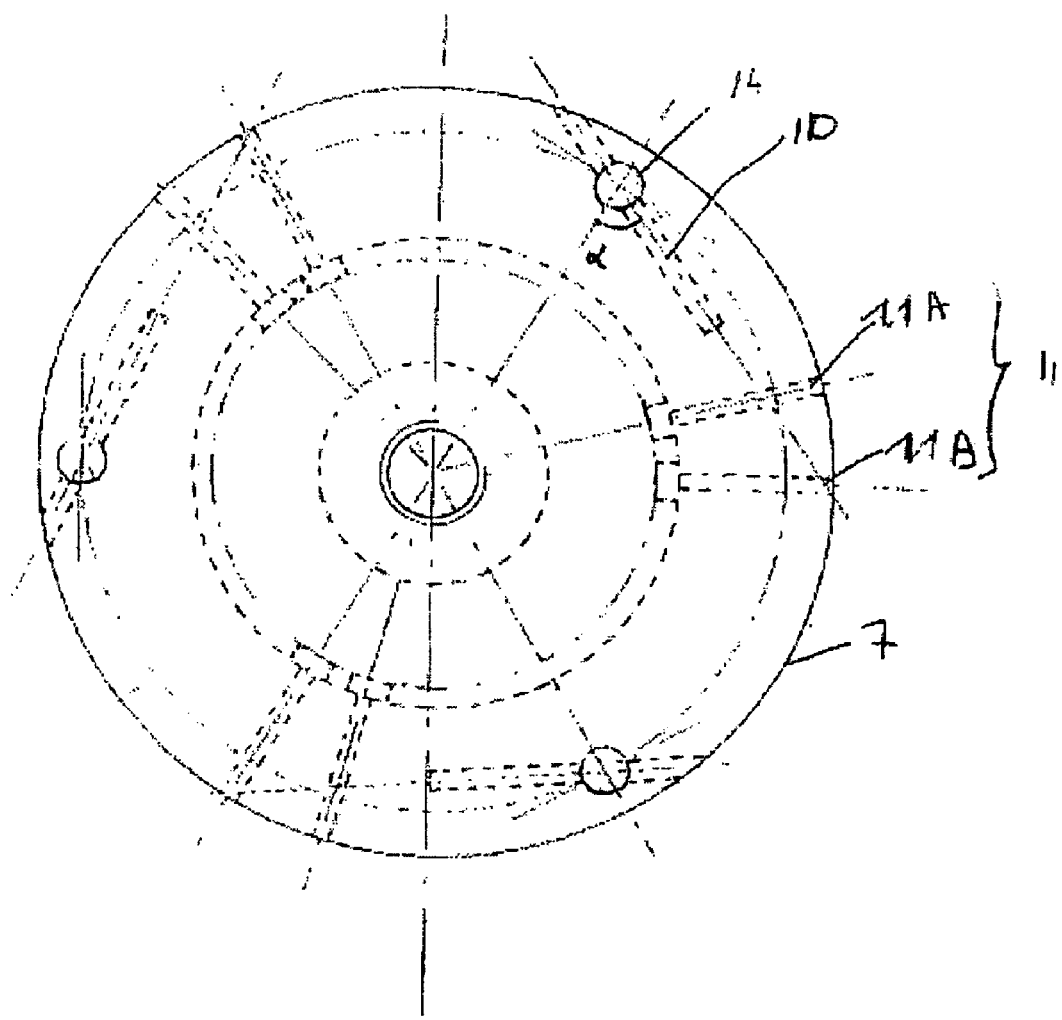
FIG. 6 shows a partial cutaway view of the pad-holder plate of the stator alone and FIG. 7 shows a partial cutaway view of the pad-holder plate, the pads having been removed.
Figure 7:
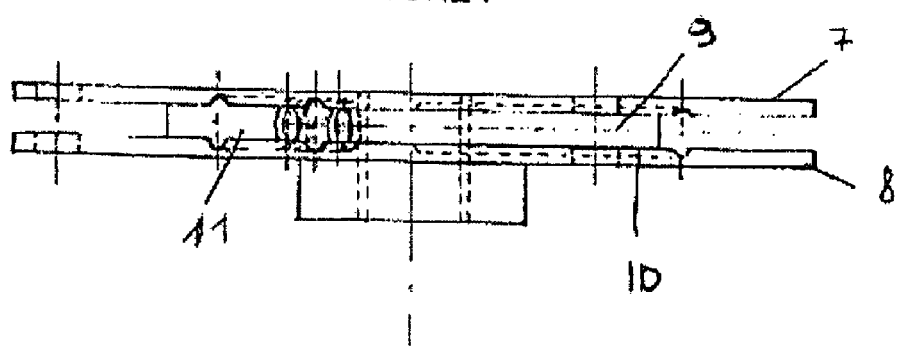

Each pad 6 mounted with play on the pad-holder plate is designed to move in a plane perpendicular to the axis of rotation of the stator 5 during passage from the engaged position into the disengaged position or vice versa, following a direction that forms an angle α in the range [60-85°] with the radius of the stator 5 passing through the pivoting axis 14 of said pad 6. This displacement of the pad is shown especially in FIGS. 3 and 4 that illustrate the passage from an engaged position into a disengaged position of said pad. The pivoting axis 14 and the receiving bearings 15 of the pivoting axis 14 that allow a freely-pivoting mounting of the pad 6 on the pad-holder plate are carried: one by the pad 6 and the other by the support plate of the pads, and they have noncomplementary shapes to allow relative angular displacement between the pads 6 and the support plate of the pads under the action of the rotor in the decelerated or immobilized state of the stator. Thus, the bearings 15 of the pivoting axis 14 have the form of an oblong hole made in the pad 6. These oblong holes are crossed by a shaft mounted stationary on the pad-holder plate. This shaft that is parallel to the axis of rotation of the stator 5 comprises the pivoting axis 14 of said pad 6. The longitudinal axis of each hole that comprises a guide path forms an angle in the range [60-85°] with the radius of the stator passing through the pivoting axis 14 of the corresponding pad 6.

To allow the re-engagement time to be optionally varied by acting on the relative position of the aforementioned springs 12 and 13, the pad-holder plate is provided with a plurality of housings 11A, 11B for receiving the same spring 12 to optionally modify the relative position, especially the distance, between the springs 12, 13 acting on the same pad 6. In the examples shown, the first and second springs 12, 13 acting on the same pad are compression springs, preferably helicoidal, with axes intersecting at the support point of the pad on the friction lining of the cylindrical body in the disengaged position of said pad 6.

In detail, the stator is composed of a shaft bearing a pad-holder plate in the vicinity of one end, and, on the other end, a cutting member-holder plate. A ball bearing is generally inserted between said plates. This pad-holder plate is composed of two circular flanges 7, 8 interconnected by a hub 9 to define a circular peripheral internal groove 16 within which the pads with the shape of pins pivoting around an axis parallel to the axis of the hub and the springs 12, 13 are accommodated at the same time. The flanges 7, 8 for each pad 6 are equipped with at least two series of grooves 10, 11 opposite, each serving to define the guide track of one spring. The first series of grooves 11 extending radially between the bottom of the groove 16 and the section of the flanges 7, 8 is used to receive the first radially-acting compression spring 12 located between the bottom of the groove 16 and the surface of the pad 6 opposite the one designed to make contact with the friction surface of the lining 4 of the rotor 3. The second series of grooves 10, designed to receive the second spring 13 that acts on the angular position of the pad 6, originates on the section of the flanges 7, 8 and extends in the direction of the bottom of the groove 16 as it passes through the pivoting axis 14 of the pad 6. These grooves 10 of the second series of grooves form, with the radius of the flanges 7, 8 passing through the pivoting axis of said pivot 14, an angle α that is preferably in the range [60-85]°.

In the examples shown, the pad-holder plate is equipped with at least three pads 6 and six springs 12, 13, of which three are located in the housings 11A or 11B. Each pad 6 has the shape of a curved pin provided on each of its ends with a bulge shown at 6A and 6C in the figures. One of the bulges, 6C, is exposed to the action of the first compression spring 12 located between the pad-holder plate and the pin surface opposite the contact surface with the friction lining. Thus, under the action of this radially-acting compression spring 12, the pad is kept in permanent frictional contact with the friction lining.

The other bulge 6A comprises openings crossed by the pivoting axis 14. The second compression spring 13 that allows the pad to be returned to the engaged position extends between this bulge 6A and the pad-holder plate. The support zone of the spring 13 on the bulge 6A is implemented in the form of a circular portion to facilitate interchangeability of the spring 12. This second spring 13 is compressed during angular displacement of said pad, corresponding to its passage from the disengaged position to the engaged position. The opening that is used to receive the pivoting axis 14 of the pad and the grooves for accommodating the second spring 13 in the flanges of the plates form an aligned combination that comprises an angle preferably near 20° with the tangent to the rotor taken to the right of the pivoting axis of said pad.

A recess 6B extends between the bulges 6A and 6C of the pad. This recess 6B is used to house the second spring 13.

The operation of such a coupler is as follows. Upon starting, the friction pads carried by the stator are permanently subjected to the action of the first compression springs 12 to be applied to the friction lining 4 of the rotor and to drive the stator into rotation. Thus, the pad occupies a position corresponding to that shown in FIG. 3 in which the friction surface between the pad and friction lining is maximum. Causing the stator to rotate generates a centrifugal force applied to the pad. This centrifugal force is added to the force of the first spring 12 to obtain driving at the same speed between the stator and rotor. When the cutting member encounters an obstacle, the cutting member strikes said obstacle; therefore, the rotary speed drops and the centrifugal force tends to diminish, or is even cancelled. As a result, the adhesion between the pads of the stator and the friction lining of the rotor is such that the resisting torque applied to the cutting member becomes greater than the pre-established nominal torque as a function of the dimension and mass of the pad, such that the cutting member stops. The pad-holder plate connected to the cutting tool likewise stops. The cylindrical friction body that is integral with the engine shaft continues to turn and the kinetic energy causes angular displacement of the pads as the rotation of the rotor continues. This relative displacement of the pad with respect to the stator causes compression of the second compression spring 13. During this displacement, the pad that is sliding over a length corresponding more to the length of the oblong hole is moved away as it disengages from the friction lining of the cylindrical body of the rotor, thus causing a reduction of the friction surface between the pad and friction lining. The contact surface is essentially reduced to zero and corresponds to a line of contact. For this reason, the rotor can continue to turn and slide on the pads without producing either significant heating or significant wear. When the cutting tool that is integral with the transmission shaft is freed from the obstacle and when the resisting torque that is applied to the cutting member becomes less than the engine torque, the pad is returned by the action of the spring 13 to an angular position corresponding to a position in which the friction surface between the friction lining and pad is maximum. This pad is kept in continuous compressive contact against the friction lining via the first spring 12 to allow the rotor to drive the stator in the clutch mode to restart. The centrifugal force is added to the effect of said springs to enhance the contact of the pads against the friction lining of the rotor. As mentioned above, depending on the characteristics of the two springs and their relative position, it is possible to cause the disengagement and re-engagement times of such a coupler to vary.

The invention claimed is:

1. A coupler (1) between a rotary engine output shaft of a cutter or a brush cutter, and a rotary cutting member (2) or a blade, said coupler (1) comprising:
   a rotor (3) configured to be made integral with the engine shaft, said rotor (3) having a form of a cylindrical body or a bell having at least some internal walls forming a friction lining (4); and
   a stator (5) configured to bear the cutting member (2), the stator (5) being configured to be driven by the rotor (3) via friction pads (6) carried by said stator (5), each pad (6) mounted on a pad-holder plate of the stator (5) free to pivot around an axis parallel to an axis of rotation of the stator (5) being exposed continuously to the action of at least one generally radially-acting compression spring (12) to be applied to the friction lining (4) of the rotor (3) and to cause the stator (5) to rotate, each pivoting pad (6) being mounted with play on said plate to be able to move angularly by sliding between two end positions, one being an engaged position in which a friction surface between the pads (6) and the cylindrical body is maximum, the other being a disengaged position in which the friction surface between the pads (6) and the cylindrical body or bell is minimum, and facilitates sliding of the pads (6) on a surface of the friction lining (4) of the rotor (3),
   wherein a passage from the engaged position into the disengaged position proceeds, when the stator (5) is slowing down, by relative displacement of the pads (6) and the stator (5) as a second spring (13) is compressed, the second spring (13) tending to return the pads (6) from the angular disengaged position to the angular engaged position in order to allow re-engagement, enabling optimum operation of said coupler, within a short time,
   the pad-holder plate is composed of two circular flanges (7, 8) interconnected by a hub (9) to define a circular peripheral internal groove (16) within which both the pads (6) and the springs are accommodated, the pads (6) having a shape of fingers pivoting around an axis parallel to an axis of the hub, and
   the flanges (7, 8) for each pad (6) are equipped with at least two series of grooves (10, 11), said at least two series of grooves including a first series of grooves and a second series of grooves, each series of grooves serving to define the guide track of one spring, the first series of grooves (11) extending radially between a bottom of the circular peripheral groove (16) and a section of the flanges (7, 8) being used to receive the radially-acting compression spring (12) located between a bottom of the circular peripheral internal groove (16) and a surface of the pad (6) opposite the pad designed to make contact with a friction surface of the lining (4) of the rotor (3), and the second series of grooves (10) designed to receive the second spring (13) that acts on an angular position of the pads (6) originating on a section of the flanges (7, 8) and extending in a direction of the bottom of the circular peripheral internal groove (16) as it passes through a pivoting axis (14) of the pads (6), the grooves (10) of the second series of grooves forming, with a radius of the flanges (7, 8) passing through the pivoting axis (14), an angle ($\alpha$) that is in a range of [60-75]°.

2. The coupler according to claim 1, wherein the first series of grooves (11) comprises a plurality of housings (11A, 11B) for receiving the at least one radially acting compression spring (12) to modify a relative position between the at least one radially acting compression spring (12) and the second spring (13)—in order to provide a clear correlation between the housings and the first series of grooves and to clarify which springs constitute the plurality of springs; acting on the same friction pads (6) so as to vary a re-engagement time corresponding to passage from the disengaged position to the engaged position of said friction pads (6).

3. The coupler (1) according to claim 1, wherein the the at least one radially acting compression spring (12) and the second spring (13)—to clarify which springs constitute the plurality of springs; acting on the friction pads (6) are helicoidal compression springs, with axes intersecting at a support point of the friction pads (6) on the friction lining of the cylindrical body in the disengaged position of said friction pads (6).

4. The coupler (1) according to claim 1, wherein the friction pads include at least three friction pads (6) and the at least one radially acting compression spring (12) and the second spring (13)—to clarify which springs constitute the plurality of springs include at least six springs (12, 13), each friction pad (6) having a shape of a curved pin provided on its ends with bulges (6A, 6C), a recess arranged between said bulges used to receive one of the bulges (6A, 6C).

5. A portable cutter with rotary cutting, or a brush cutter, comprising:
   a coupler between a rotary engine output shaft and a cutting member, wherein the coupler corresponds to the coupler of claim 1.

* * * * *